United States Patent [19]

Anderson et al.

[11] Patent Number: 5,035,153

[45] Date of Patent: Jul. 30, 1991

[54] LUBRICATION SYSTEM FOR ROLLER TRANSMISSION

[75] Inventors: William J. Anderson, North Olmsted; Algirdas Bielskus, Cleveland, both of Ohio

[73] Assignee: Nastec, Inc., Cleveland, Ohio

[21] Appl. No.: 557,737

[22] Filed: Jul. 26, 1990

[51] Int. Cl.$^5$ ............................................. F16H 1/44
[52] U.S. Cl. ........................................ 74/206; 74/202; 74/467
[58] Field of Search ...................... 475/159, 165, 183; 74/467, 202, 206

[56] References Cited

U.S. PATENT DOCUMENTS

| | | | |
|---|---|---|---|
| 4,296,648 | 10/1981 | Okano et al. | 74/206 X |
| 4,368,802 | 1/1983 | Grabill et al. | 74/467 X |
| 4,442,729 | 4/1984 | Hayakawa | 74/467 |

FOREIGN PATENT DOCUMENTS 58-131453  8/1983  Japan .................................. 475/159

Primary Examiner—Allan D. Herrmann
Assistant Examiner—William O. Trousdell
Attorney, Agent, or Firm—Longacre & White

[57] ABSTRACT

A lubrication system for a roller transmission having a sun roller, at least one row of planet rollers, and a surrounding ring roller. The lubrication system includes a fluid feed tube supplying lubricant to a distributing manifold. The manifold in turn supplies a plurality of cross feed tubes which direct fluid to the contacting surfaces between the adjacent rollers. The lubrication system also includes a lubrication conduit and connected cooling channels in the sun roller which feed lubricant to the interface between the sun roller and first row of planet rollers.

3 Claims, 3 Drawing Sheets

LUBRICATION SYSTEM FOR ROLLER TRANSMISSION

Field of the Invention

The invention relates to improvements to roller type traction drives in the transmission field. More particularly, the present invention relates to the addition of a planet and sun roller lubrication system to high speed, high horsepower, high torque traction type roller transmissions.

BACKGROUND OF THE INVENTION

Transmissions of the roller transmission traction type are known. An example of this type of transmission is disclosed in U.S. Pat. No(s). 3,216,285, 3,254,546, 3,367,214, 3,364,761, and 3,417,370 to Nasvytis. This series of patents describe the basic roller transmission concepts relating to multiroller traction drives including improvements to vary the normal force applied to the rollers.

These types of transmissions theoretically have broad application in a variety of uses from marine to helicopter hybrid transmissions. Roller transmissions offer smooth, quiet, compact power transmission relative to geared transmissions, with high efficiency. In contrast to geared transmissions, which inherently generate significant torsional oscillations as the load transfers between teeth, roller transmissions are relatively vibration free. As such, the transmission is more reliable in high power, high speed applications where tooth growth and meshing become an increasing design problem.

A roller transmission transmits power through the traction forces on normally loaded rolling elements, utilizing a special traction fluid as both a lubricant and traction enhancer. The fluid used is typically a cycloaliphatic hydrocarbon which possesses elastohydrodynamic properties that allow it to essentially plasticize instantaneously while under the contact loads of the rollers. As such, torque is transmitted through the elastohydrodynamic film so that the rollers themselves are not in true contact. As the traction characteristic of the fluid is improved, ie, enhanced resistance to shear, the result is an increase in the maximum available traction coefficient with a consequent increase in power and speed capability at equivalent contact forces, ie, normal loads. This allows lower operational roller contact forces, reducing roller wear, heat generation and other power losses, and permits a greater maximum power and speed capacity. At all other times, this same fluid circulates throughout the transmission providing necessary lubrication and cooling.

In view of the critical role the tractive fluid plays in a traction drive, it is essential that the fluid be properly distributed, recycled, cooled, and redistributed to maintain the reliability, durability, efficiency, and functional integrity of the transmission.

To accomplish the placement of fluid at the roller interfaces, prior roller transmissions used an externally applied lubrication system with the rollers operating in a fluid bath. While this system functions at comparatively low rpm and low power systems, the fluid is not supplied in sufficient volume at high speeds to achieve required tractive and coolant effects, resulting in excessive heat build up. Slip or excessive wear, both of which may irreparably damage the roller surfaces, will then occur.

In view of the foregoing shortcomings of known roller transmissions to reliably transmit high power and torque at high speeds, the present invention proposes a lubrication supply and replacement system for adequately placing tractive fluid at the interface between adjacent rollers.

Another problem encountered in high speed roller transmissions is the physical expansion of component parts at high rotational velocities. The outer ring roller, in particular, because of its relatively large diameter and small radial section is subject to centrifugal growth and to changes in effective diameter with changes in load level. To accommodate these dimensional variations, the planet rollers in a transmission according to the present invention are equipped with movable bearings assemblies which accommodate limited roller growth.

SUMMARY OF THE INVENTION

In a high power density, high speed drive it is a necessity to supply lubricant directly to the roller contacts and to provide positive cooling of the sun roller. To accomplish this, the present invention proposes a unique lubrication supply system for a roller transmission. One aspect of the system comprises a sun roller having a central conduit and a plurality of radial holes leading therefrom. These holes provide direct cooling of the sun roller and supply fluid to the interface between the sun roller and first row of planet rollers, and other rollers in the drive, for both lubrication and cooling upon rotation of the sun roller.

A second aspect of the system is an appropriately shaped manifold which supplies fluid to a plurality of cross flow tubes positioned between the first and second row of planet rollers. The cross tubes are provided with holes or nozzles along their length to distribute the fluid evenly across the roller surfaces between the first and second row of planet rollers.

To aid in placing fluid evenly and at a constant rate, the entire lubrication system from the feed tube to the manifold and supply conduits, the cross flow tubes and sun roller, is under a positive pressure. The fluid flows radially outward by virtue of centrifugal action to lubricate and cool the entire roller cluster. It exits the cluster from between the ring rollers and load rings where it flows into a collection manifold for cooling and recycling to the various sites throughout the system.

While in the design provided herein for illustrative purposes the cross flow tubes extend through the entire length of the drive, the concept herein is more broadly directed. Rather than cross tubes, virtually any form of fluid carrying projection can be utilized to place fluid at a designated location. The exact configuration and combination of projections, tubes, nozzles, etc, will depend on the balanced desire for lubrication, cooling, traction, verses the losses encountered due to the churning of oil.

Another aspect of the present invention is to solve the problem of roller expansion during operation. Second row planet support bearings are placed within journals having flattened opposite outer surfaces. The flattened surfaces are aligned in complementary radial slots within the transmission assembly so that the bearings allow the planet rollers to move radially, as necessary, during operation of the transmission. In this manner, roller growth and associated bearing movement is accommodated without altering the relative contacting relationships of the rollers.

These and other aspects of the invention will become apparent to those of ordinary skill in the roller transmis-

DETAILED DESCRIPTION OF THE PREFERRED EMBODIMENT

Figure 1:
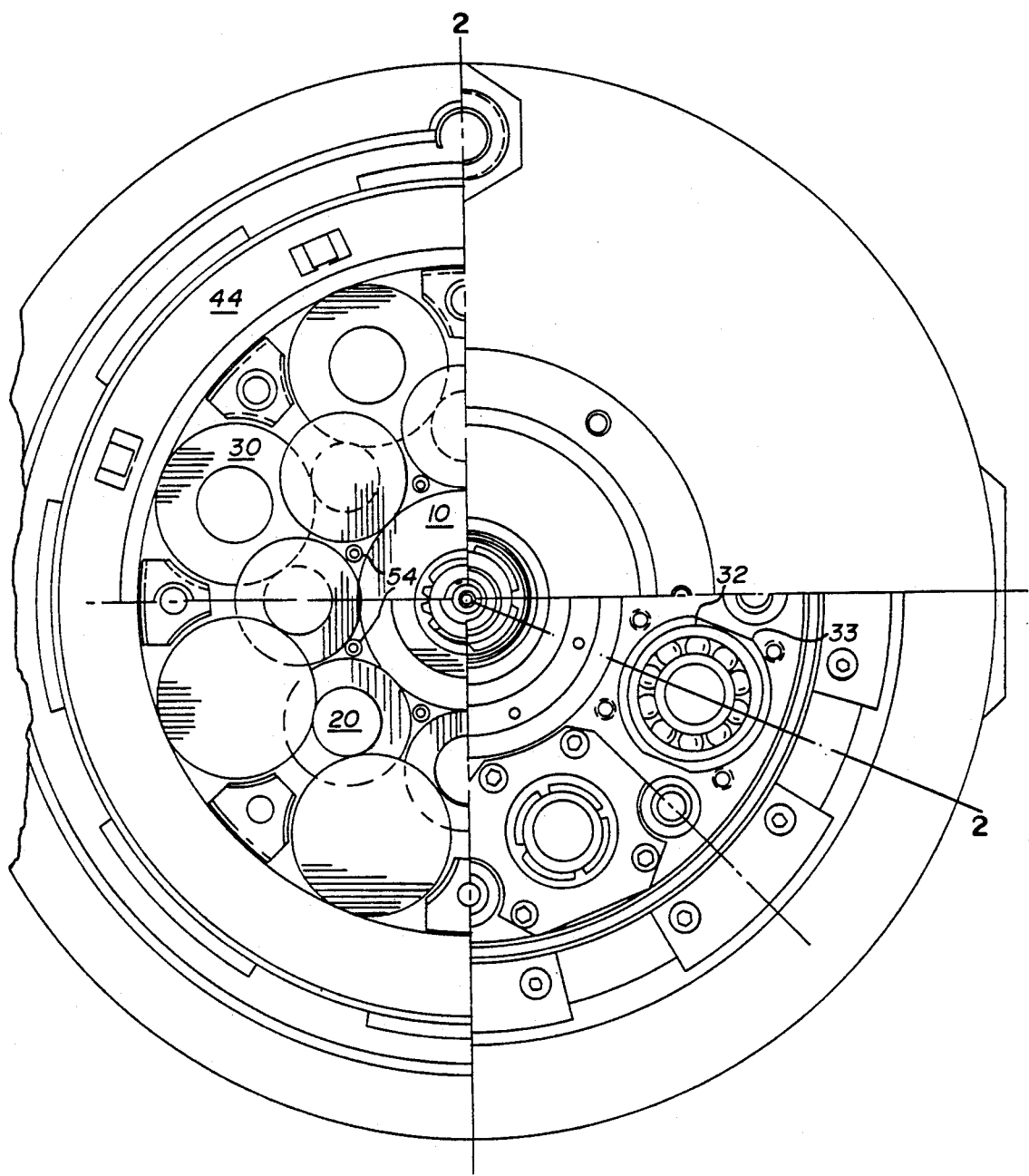
FIG. 1 is a plan view of a double row roller transmission incorporating a lubrication system according to the present invention.
Figure 2:
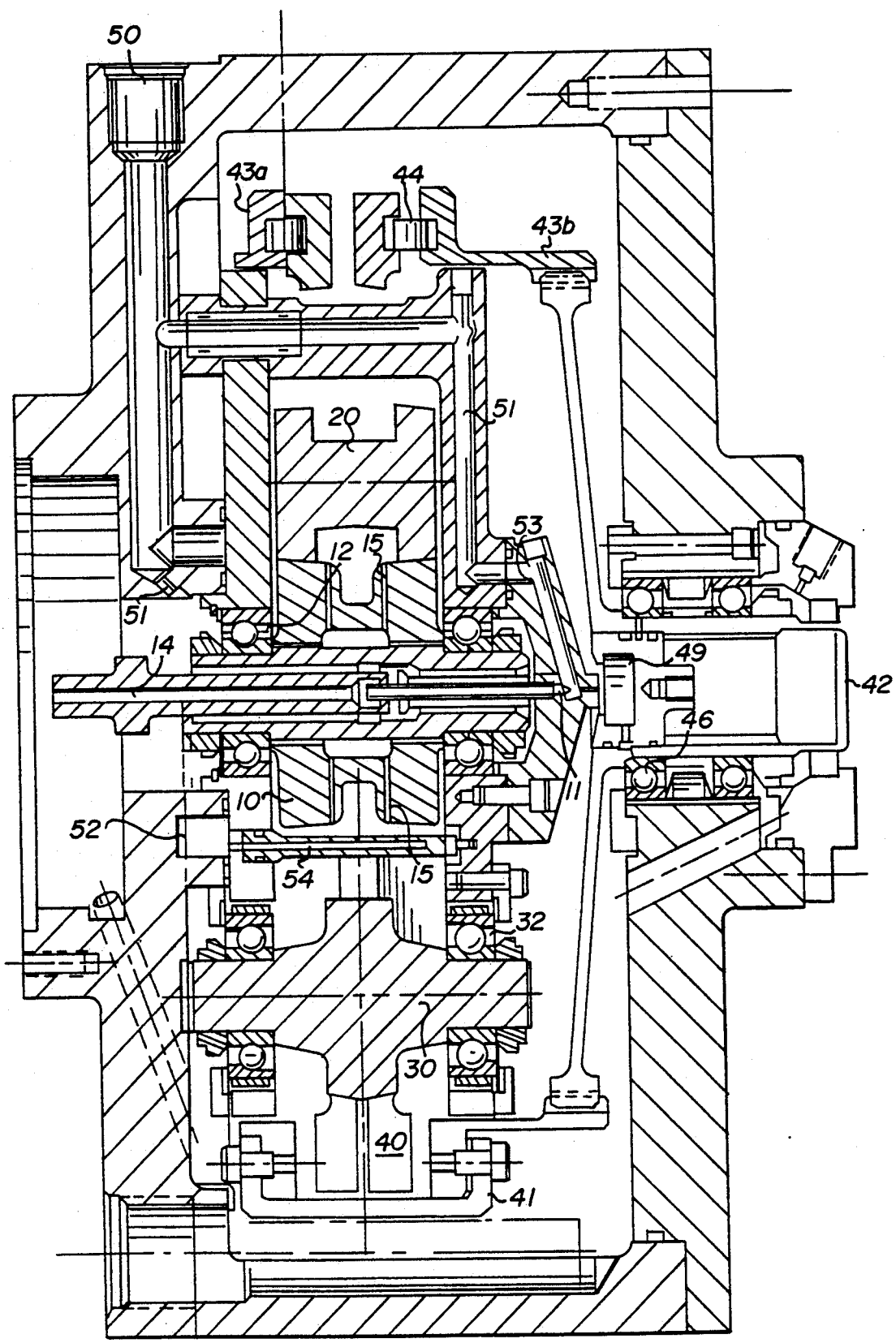
FIG. 2 is a sectional view along line 2—2 in FIG. 1.

The drawings disclose a double row planet roller transmission. The input to the transmission is through the sun roller 10 which engages and drives a first row of planet rollers 20. The first row planet rollers are held in place between the sun roller and the second row planet rollers 30 which are journalled in bearing assemblies 32. The second row of planet rollers in turn contacts and drives the surrounding ring roller 40. The ring roller is connected to a power take off shaft 42 by a set of clamps 41 and load rings 43a and 43b. Load ring 43b transmits power to shaft 42 through a splined connection. Cam acting torque loader rollers 44 automatically adjust roller loading to the torque requirements of the drive.

Figure 3:
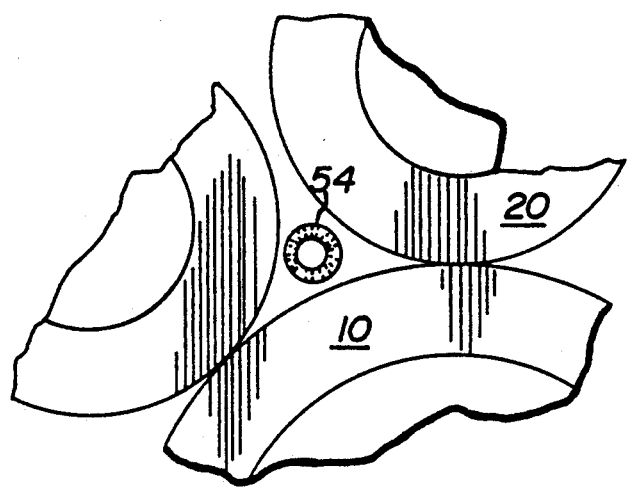
FIG. 3 is an enlarged view of a lubrication cross tube positioned between the first and second row of planet rollers.
Figure 4:
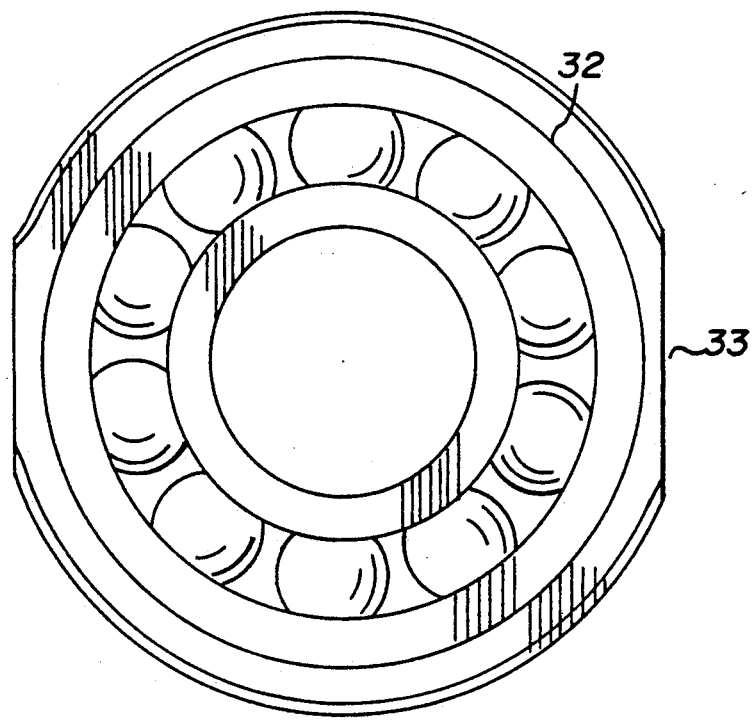
FIG. 4 is a plan view of a flattened side wall bearing assembly for supporting the planet rollers.

The lubrication system comprises a feed tube 50 which connects to a ring shaped manifold 52. The manifold 52 supplies each of a plurality of cross tubes 54 positioned around the transmission at regular intervals and near the roller contact surfaces (see FIGS. 1 and 3). The cross tubes 54 include a plurality of spray holes or nozzles for evenly directing lubricant to the interface between adjacent rollers.

The feed tube 50 also includes a plurality of nozzles located thereon for directing lubricant at selected locations elsewhere in the transmission. For example, nozzles 51 and 53 direct fluid to the bearings of the sun roller. The feed tube 50 also supplies fluid to a reservoir 49 located within the end of the output shaft 42 so as to lubricate the output bearings 46 associated with the shaft.

Most importantly, the feed tube 50 also supplies fluid to a lubricant supply conduit 11 located within the sun roller 10. Conduit 10 feeds the plurality of cooling/lubricant holes 15 in the sun roller. As the sun roller rotates, lubricant is forced through channels 15 to the outer surface of the sun roller 10. In this manner, fluid is evenly and constantly distributed within the body of the sun roller. After exiting from the sun roller, the fluid is available to lubricate and cool other rollers in the drive.

Owing to the combination of feed tube 50, manifold 52, cross tubes 54, and sun roller channels 15, the roller transmission is provided with a constantly replenished source of traction fluid at the necessary roller contact surfaces. Further, the additional nozzles and connections to the feed tube 50 supply lubricant at critical bearing locations. In this manner, high speed and power applications can be reliably accomplished through a roller type transmission while maintaining the inherent advantages of quiet and vibration free operation.

Rotation of the rollers moves the fluid radially outward until it exits from the roller cluster through gaps between the rings rollers and load rings. Fluid is pumped out at the lubricant drain. It is then cooled and recycled to feed tube 50 under positive pressure. An appropriate filtration system may also be incorporated depending on the working environment and design life of the transmission.

In another aspect of the present invention, bearing assemblies 32 for the second row of planet rollers are provided with flattened sidewalls 33 for the housing members. The bearing housings are placed in complementary shaped supports in the housing of the transmission so that movement of the bearing radially outwardly with respect to the geometry of the transmission is allowed. In this manner, a limited amount of radial growth of the component parts of the transmission can be tolerated during operation without disturbing the relative spatial positioning of the components.

We claim:

1. A lubrication system for a roller transmission having a sun roller and at least a first row of surrounding planet rollers in contact with and driven by said sun roller, and a power takeoff ring roller surrounding and contacting and being driven by said planet rollers, or vice versa for speed increasing applications, said lubrication system comprising:

a first lubrication feed tube for supplying lubricant under positive pressure;

a conduit connected to said feed tube and located within said sun roller, said conduit being connected to a plurality of radially directed channels within said sun roller, whereby;

during rotation of said sun roller, lubricant is forced outwardly through said radially directed to channels to the interface between said sun roller and said first row of surrounding planet rollers.

2. A lubrication system as in claim 1, further comprising:

a distribution manifold connected to said feed tube, said manifold supplying lubricant to a plurality of cross feed fluid distribution means which direct lubricant to contacting roller surfaces between the sun roller and planet rollers.

3. A lubrication system as in claim 2, further comprising:

at least one fluid directing nozzle attached to said feed tube for directing lubricant at a bearing for said sun roller.

* * * * *